United States Patent Office

3,706,581
Patented Dec. 19, 1972

3,706,581
SOIL GROUTING PROCESS AND COMPOSITION
Anthony James Whitworth, Scarborough, Ontario, Canada, William Arthur Lees, Chandlers Ford, England, and Stephen Yi-Sun Tung and Ernest Anthony Hajto, Scarborough, Ontario, Canada, assignors to The Borden Company, New York, N.Y.
No Drawing. Filed Oct. 5, 1970, Ser. No. 78,147
Int. Cl. E02d 3/12
U.S. Cl. 61—36
21 Claims

ABSTRACT OF THE DISCLOSURE

A process for stabilizing soil comprises impregnation with an alkaline aqueous gel-forming composition consisting essentially of (a) a polyphenolic material such as a vegetable tannin extract and (b) a precalculated amount of a gelling agent dispersible in said composition and containing a complexing element selected from silicon, chromium$^{VI}$, vanadium and molybdenum. The method is surprisingly effective in the absence of formaldehyde and has the advantage of eliminating obnoxious fumes.

BACKGROUND OF THE INVENTION

This invention relates to a grouting process and grouting compositions for stabilizing soil. Grouting is the term used to denote the process of stabilizing sand, soil, subsoil or similar substrates in order to increase the strength and load bearing characteristics of the area and to seal off water or liquid flows in the grouted area. The term "soil" is used herein to designate any geological matter having sufficient porosity to permit impregnation by the method of the present invention.

Consolidation of loose soils by impregnating, mixing with or injecting into the soil, substances having a binding action is of great importance in many civil engineering, mining and drilling operations. There is, therefore, a demand for compositions which can be injected into porous ground so as to form a substantially compact and impervious mass.

Types of grouting methods and compositions which have been proposed include on one hand the traditional procedures based on cement and on the other hand several "chemical grouts" which have aimed to overcome the deficiencies of cement but which themselves have various deficiencies.

The severe limitations of cement result from the fact that the grout itself is particulate and is consequently unable to penetrate fine substrates. Furthermore, cement systems have relatively long and uncontrollable curing rates which make cement grouts impractical for cutting off fast flowing water.

Among the chemical systems, one based on the polymerization of acrylamide and N,N-methylene bisacrylamide has the disadvantages of high cost, high toxicity, low structural strength and considerable contraction in the absence of water. Others such as those based on magnesium acrylate, methylene bisacrylamide and acrylonitrile have similar disadvantages.

Grouts have also been disclosed with sodium silicate as principal component in admixture with reagents such as lime slurry, sodium bicarbonate, copper sulfate and aluminum salts. In such prior art compositions the silicate content is between about 30% to 50%, the strengths of gel obtainable are low and there is no perceptible increase in the strength of the grouted soil.

Particularly effective grouting systems have been achieved using aqueous alkaline gel-forming compositions containing various appropriate polyphenolic vegetable materials together with formaldehyde or a formaldehyde donor. Thus, British Pat. No. 1,122,308, assigned to Borden (U.K.) Ltd., claims a method comprising impregnating the soil with an alkaline gel-forming composition containing a vegetable tannin extract and a formaldehyde compound selected from formaldehyde, paraformaldehyde or a phenol-formaldehyde resole, and allowing the treated soil to harden. This method is improved by incorporating, just before impregnation, an additional component capable of controlling the rate of gelling or hardening. Thus U.S. Pat. 3,391,542 assigned to Rayonier, Incorporated uses soluble salts of chromium, iron or aluminum for this purpose with various degrees of effectiveness, and U.S. application for patent Ser. No. 51,359 (June 30, 1970) covers a Borden invention which includes in the gel-forming composition a gelling agent containing a complexing element selected from silicon, vanadium, molybdenum, manganese, titanium, copper, zinc and zirconium.

A serious deficiency of these various methods using formaldehyde, however, is the nuisance resulting from the obnoxious formaldehyde fumes. Although such nuisance is somewhat mitigated by the use of a formaldehyde compound such as paraformaldehyde, with reduced vapor pressure of formaldehyde, special precautions must still be taken by the working personnel, such as the use of gas masks when operating in confined areas.

SUMMARY OF THE INVENTION

A method has now been found whereby an aqueous alkaline polyphenolic grouting composition can be made to gel in a precalculated time in the absence of formaldehyde or formaldehyde donor by including in said composition a carefully controlled proportion of a compound dispersible therein and derived from an element selected from silicon, vanadium, molybdenum and chromium$^{VI}$.

Since these elements all possess the tendency to form complexes in alkaline aqueous solution with water and with hydroxyl ions, they are designated herein as complexing elements.

Most of these complexing elements form true solutions in the aqueous grouting compositions, being present largely as hydroxylated or hydrated anions such as silicate, chromate, vanadate or molybdate.

The terms "dispersible" and "dispersion" as used herein are intended to include "soluble" and "solution" respectively.

Unexpectedly, compositions of the present invention are capable of forming gels quite rapidly at temperatures close to freezing, as for example at 5° C.

Briefly stated, the method of this invention includes the steps of (A) treating the soil with an aqueous alkaline gel-forming liquid comprising (a) a polyphenolic material selected from vegetable tannin extracts, catechins and tree bark extracts, said polyphenolic material being soluble in alkaline solution, able to gel rapidly and possessing a reactivity measured by its ability to combine with formaldehyde and (b) a gelling agent dispersible in said composition and containing a complexing element selected from silicon, chromium$^{VI}$, vanadium and molybdenum; and (B) allowing the treated soil to form a substantially compact mass. The invention also includes the grouting compositions used in carrying out said method.

It has been surprisingly found that gelling agents of this invention not only effect a rapid gelling action but also result in a grouted structure which has a strong resistance to compressive forces such as is developed by the same composition in the presence of formaldehyde.

The particular gelling agents found to be effective in the present invention are unpredictable on the basis of previous findings. While the agents of this invention are also effective in the presence of formaldehyde, not all of the agents that are effective in the presence of formaldehyde are also effective in the present invention. Many of such compounds were investigated and found to be unsatisfactory in the present invention, some of them developing pastes instead of gels and not conferring strength to impregnated soils.

By precise control of the relative proportion of the gelling agent of this invention, the time required to form the gel of solid phase of the grouted structure can be controlled correspondingly to take place over a period selected from the range of times from a few minutes to several hours after injection, as needed for suitable placement of the grout. In general, the amount of gelling agent required to effect a particular gelling rate is between about 1.3 to 6.0 times as great as the amount which is sufficient when formaldehyde is present.

The gelling agents of this invention are effective in relatively small amounts, some of the advantages of the invention being observable with as little as 0.1% of complexing element based on weight of the polyphenolic material component. The efficacy of sodium silicate in such relatively small amounts is surprising in comparison with the aforementioned grouts of prior art requiring solutions containing sodium silicate in concentrations as high as 30% to 50% by weight.

DETAILED DESCRIPTION

The grouting process and composition of this invention have the advantages that the raw materials used are cheap, readily available, dispersible in aqueous alkaline solution at low temperatures, and easy to apply on site.

The grouting process of this invention is capable of adjustment, by variation of the components, to have a large controllable range of gel times over a wide range of temperature and climatic conditions to achieve accurate placement of grout solution into the substrate.

The present invention has particular utility in the treatment of subterranean strata of finely porous structure, such as sandstone, by injecting the grouting composition into the strata under pressure, e.g. any pressure above atmospheric, depending on the porosity of the soil.

Since the dispersions of this invention have low initial viscosity, comparable to water, deep penetration into finely pored substrates is facilitated. But when less deep penetration is desired, as when the soil is easily penetrated because of larger pore size, the relative proportion of gelling agent in the composition can be increased to attain quick gelation.

The compositions of this invention have relatively low toxicity and are easily handled by inexperienced operating personnel. The absence of formaldehyde fumes is a decided advantage, eliminating requirements for gas masks and other such special precautions.

Treatment of soil with grouting compositions of this invention can produce grouted soil which is stable and possesses the required load bearing properties. The grouted substrate is also resistant to deterioration by atmosphere and by water.

Polyphenolic materials suitable for use in the present invention include vegetable tannins such as those extracted from mimosa, quebracho, mangrove and wattle; catechin and catechu such as extracted from acacia catechu and acacia suma, mahogany wood and the like; and the alkaline extracts of certain coniferous tree barks including the barks of Western hemlock, Douglas fir, white fir, Sitka spruce and Southern yellow pine particularly such as prepared by the methods of U.S. Pats. 2,782,241; 2,819,295 and 2,823,223.

The preferred polyphenolic material is the readily available vegetable tannin extract known as mimosa extract, an extract from acacia mollissima, and the invention is illustrated by particular reference to this material. Other vegetable tannin extracts include those obtained from eucalyptus crebra, callitris calcarata and callitris glauca.

While all the aforementioned polyphenolic materials are commercially available, their exact chemical constitution is not known. Utility of a particular product in carrying out this invention is based on possession of three properties, namely solubility in alkaline solutions, ability to gel rapidly in the compositions of this invention and a reactivity measured as ability to combine with formaldehyde.

The ability to combine with formaldehyde is conveniently measured as the grams of formaldehyde which react in four hours with 100 grams of the dry commercial polyphenolic product dissolved in aqueous solution of pH 9.5. Such an alkaline solution containing accurately known amounts of polyphenolic product and of formaldehyde is allowed to stand for four hours, the remaining formaldehyde is accurately determined and the reacted formaldehyde is calculated by difference. A suitable method for determining formaldehyde is given by Lemme, Chem. Ztg. 27, 896 (1903). To be useful in the present invention the formaldehyde combining capacity of the polyphenolic material measured as the ratio of parts reacted formaldehyde to 100 parts polyphenolic material on dry basis should be at least about 5.0. This is an empirically determined fact and does not explain the mechanism whereby the gelling agents of this invention are effective in the absence of formaldehyde, the gelling reaction of this invention being incompletely understood.

The concentration of said polyphenolic material in the aqueous grouting dispersion can be in the range of about 2% to 45%. However, higher concentrations in this range correspond to dispersions of high viscosity and are applicable only when the soil has sufficiently high permeability. On the other hand, since the strength obtainable in the grouted soil decreases with decreased concentration of polyphenolic material, the lowest concentrations in the stated range are suitable only when it is sufficient to render the soil merely impervious. To obtain the benefits of high strength of grouted soil as well as the opportunity to control gel time, it is preferred to have the polyphenolic material at a concentration level of between about 4–27%, more particularly 7–23% of the weight of the aqueous composition.

The gelling agents of this invention can be selected from the aqueous alkali dispersible compounds of silicon, chromium$^{VI}$, vanadium and molybdenum.

These complexing elements are amphoteric, all having in some degree the attributes of both metallic and non-metallic elements. Thus they are dispersible in the alkaline aqueous grouting composition of this invention largely as hydroxylated or hydrated anions. However, depending on the degree to which the metallic or non-metallic properties predominate, the solution may contain also cations or hydroxide hydrosol. The gelling agent can be introduced into the aqueous grouting composition of this invention in a form in which the complexing element is already anionic, as in the case of the silicates and molybdates of the alkali metals. Alternatively, the gelling agent can be added to the alkaline composition in a form in which the complexing element is cationic or non-ionized and which is chemically converted on hydrolysis by an alkaline medium into a predominantly anionic form. The latter is the case, for example, when vanadium pentoxide is used as gelling agent; this substance is largely converted by hydrolytic action of the alkaline medium to the anionic form of vanadate.

In short, the gelling agent can exemplarily be an alkali-dispersible salt of silicate, chromate, dichromate, vanadate or molybdate. Illustratively, such a salt can be a potassium, sodium, lithium or ammonium salt of any of these anions. Alternatively, the gelling agent can also be any chloride, sulfate, nitrate, hydroxide or oxide of any of the stated elements which compounds are dispersible in aqueous alkaline solutions. Illustratively, such compounds include vanadium pentoxide, chromium trioxide and molybdenum trioxide.

In greater detail, examples of gelling agents which can be used in operating the method of this invention include sodium metasilicate ($Na_2SiO_3$), sodium metasilicate nonahydrate ($Na_2SiO_3 \cdot 9H_2O$), commercial sodium silicate solutions having different ratios of $Na_2O$ to $SiO_2$ such as "egg-preserver solution" containing about 40% $Na_2Si_3O_7$, potassium silicate of variable composition ($K_2Si_2O_5$ to $K_2Si_3O_7$), ammonium fluosilicate, vanadium pentoxide, vanadyl chloride, vanadyl trichloride, ammonium metavanadate, molybdenum trioxide, ammonium molybdate, sodium molybdate, potassium molybdate, chromium trioxide, sodium dichromate, potassium chromate and ammonium chromate.

The preferred gelling agents, because of cheapness and facility of solution, are commercial grades of sodium silicate or sodium dichromate.

As to the amounts of gelling agent which can be used in carrying out this invention, extremely small quantities corresponding to as little as 0.1% of complexing element, based on the dry weight of polyphenolic material, have been found to be measurably effective on the rate of gelation. The amount required to obtain a desired gel time depends upon the dilution of the polyphenolic component and the pH, as well as the nature of the soil to be grouted and the identity of the gelling agent. Up to about 100% of complexing element, based on dry polyphenolic material could be used under certain combinations of these parameters, but in the interest of economy, conditions which permit lower amounts are preferable. In general, amounts corresponding to between about 0.1% and 30.0% of complexing element based on polyphenolic solids are suitable. Amounts corresponding to about 1% to 15% of complexing element based on polyphenolic solids are suitable. Amounts corresponding to about 1%

In the typical practice of this invention, suitable polyphenolic material is dispersed in sufficient water containing sufficient alkali to form a dispersion of the desired concentration (in the range 2–45% by weight of solution) and the pH is adjusted to between 8.5 and 11.5 (preferably between 9.0 and 10.5). For the purpose of adjusting pH, sodium hydroxide, potassium hydroxide, sodium carbonate, potassium carbonate, or equivalent alkali can be used. The amount of alkali needed to attain such pH will depend on the particular polyphenolic material, and only very small additional amounts of alkali tract, for example, it can be largely in the form of already neutralized sodium salts of the polyphenolic material, and only very small additional amounts of alkali may be required. This stock solution is designated as Dispersion A.

A particularly convenient modification of this procedure is provided by first preparing a solid powder of the polyphenolic material together with certain adjuvants such as sodium chloride filler and minor amounts of preservatives, anti-dusting agents, anti-foam agents and the like. This powder is then shipped to the grouting site and used to prepare Dispersion A.

Such a powder can suitably contain between about 1 and 100 parts by weight of sodium chloride per 100 parts of polyphenolic solids, the preferred amount being between about 5 and 15 parts per 100 parts of polyphenolic material.

A second aqueous dispersion designated as Dispersion B is prepared with sufficient alkali to give substantially the same pH as the Dispersion A and with the amount of gelling agent to give the required concentration. Just prior to the grouting operation and/or during injection, the two dispersions A and B are fed through metered pumps and mixed thoroughly. The volume ratio of the two solutions can be varied to suit the application conditions which include density and porosity of soil, ambient temperature, mix-water temperature, and the gel strength and grout strength desired.

In order to gain maximum utility of the grouting operation it is extremely important to have accurate and close control of the length of time between the mixture of dispersions A and B and the injection of the mixture into the soil as well as of the time it takes to gel the composition. This control is made possible by controlling the relative amount of gelling agent used. The dependence of gel-time upon the concentration of the principal ingredients (polyphenolic and gelling agent respectively) and in particular on the weight ratio of gelling agent relative to polyphenolic as well as on temperature and pH are illustrated in the examples given further below. The present inventors have found that the gel time can be varied at will from about one or two minutes to several hours by varying the type and amount of the gelling agent of this invention. Experiments have also shown that the inclusion of the gelling agent not only results in increased rate of gelation but also effects an increased resistance of the grouted structure to compressive forces. This increase in resistance to pressure goes through a maximum as the proportion of gelling agent is increased.

The invention will be further described in connection with the following examples which are set forth for the purpose of illustration only. In these examples and elsewhere herein proportions are in parts by weight unless specifically stated to the contrary.

EXAMPLE 1

A powdered mixture was made containing 200 parts by weight of mimosa extract solids (having a formaldehyde combining capacity of 20.3), 20 parts of sodium chloride filler, 4.0 parts of dibutyl phthalate and 0.4 part carnea oil, a proprietary low-viscosity mineral oil product obtained from Shell Chemical Company.

An aqueous solution was then prepared containing the 224.4 parts of the powdered mixture, 30 parts of sodium hydroxide and sufficient water to make 900 parts of solution. This solution is identified as Dispersion A.

To a solution of one gram sodium hydroxide in 72 grams of water there was added 27 grams of vanadium pentoxide. Within about 15 minutes a homogeneous dispersion resulted. This solution is identified as Dispersion B.

A 90-gram portion of Dispersion A was added to the receptacle of a Tecam Gelation Meter, and 10 grams of Dispersion B was added thereto with thorough mixing. The weight ratio of the complexing element vanadium to mimosa solids was 7.5%. The "gel-time" needed to develop resistance to the fall of the plunger in the Tecam instrument was found to be 266 minutes. The entire operation was carried out with ambient temperature being about 25° C. In a corresponding experiment in which the gelling agent of the instant invention was absent, Dispersion B being replaced by 10 grams of 1% aqueous sodium hydroxide, no gel at all was formed.

EXAMPLE 2

To a solution of one gram sodium hydroxide in 9 grams of water there was added 90 grams of a commercial sodium silicate solution containing 28.7% $SiO_2$ and 8.9% $Na_2O$. This solution is identified as Dispersion B'.

Following the procedure of Example 1, ninety grams of Dispersion A was added to the receptacle of a Tecam Gelation Meter and 10 grams of Dispersion B' was added thereto with thorough mixing. The weight ratio of the complexing element silicon to mimosa solids was 7.5%. The "gel-time" needed to develop resistance to the fall of the plunger in the Tecam instrument was found to be 0.8 minute.

EXAMPLE 3

To a solution of one gram sodium hydroxide in 54 grams of water there was added 45 grams of sodium dichromate dihydrate ($Na_2Cr_2O_7 \cdot 2H_2O$). This solution is identified as Dispersion B''.

Following the procedure of Example 1, ninety grams of Dispersion A was added to the receptacle of a Tecam Gelation Meter and 10 grams of Dispersion B'' was added thereto with thorough mixing. The weight ratio of the complexing element chromium$^{VI}$ to mimosa solids was 7.5%. The "gel-time" needed to develop resistance to the fall of the plunger in the Tecam instrument was found to be 3.0 minutes.

EXAMPLE 4

To a solution of one gram sodium hydroxide in 61 grams of water there was added 38 grams of sodium molybdate dihydrate ($Na_2MoO_4 \cdot 2H_2O$). This solution is identified as Dispersion B'''.

Following the procedure of Example 1, ninety grams of Dispersion A was added to the receptacle of a Tecam Gelation Meter and 10 grams of Dispersion B''' was added thereto with thorough mixing. The weight ratio of the complexing element molybdenum to mimosa solids was 7.5%. The "gel-time" needed to develop resistance to the fall of the plunger in the Tecam instrument was found to be 240 minutes.

EXAMPLE 5

In a series of experiments, the procedure of Example 1 was followed except that the vanadium pentoxide was replaced successively by a series of compounds of complexing elements in such an amount as to have the weight ratio of complexing element to mimosa solids in each Tecam receptacle mixture always equal to 7.5%. The compounds used, with corresponding complexing element given in parenthesis, were potassium permanganate (Mn), chromic chloride hexahydrate ($Cr^{III}$), nickel sulfate hexahydrate (Ni), manganese sulfate monohydrate (Mn), zinc nitrate hexahydrate (Zn), calcium chloride dihydrate (Ca), and cupric chloride dihydrate (Cu). No gel developed in any of these compositions. This is not an illustration of the instant invention.

EXAMPLE 6

Two parallel series of experiments with ambient temperature at 5° C. and 25° C. respectively were carried out using grouting solutions of pH 9.7, prepared according to the procedure of Example 2 and containing 20% by weight of mimosa extract solids. As summarized in Table I, various amounts of sodium silicate gelling agent were used, corresponding to the weight percents of complexing element silicon given in Column (a). Column (b) gives the weight ratio of silicon ($W_M$) to mimosa solids ($W_T$). Column (c) gives the gel time measured as in the previous examples and Column (d) gives the comparative gel strengths after two days, evaluated by using a "Precision" penetrometer and expressed as the distance in millimeters penetration into the gel surface.

TABLE I.—SILICATE AS GELLING AGENT, MIMOSA SOLIDS AT 20% LEVEL

| (a) | (b) | (c) | | (d) |
|---|---|---|---|---|
| | | Gel time (min.) | | Gel strength after 2 days at 25° C. (mm.) |
| $W_M$ | $W_M/W_T$, percent | 5° C. | 25° C. | |
| 2.68 | 13.4 | 0.3 | 0.2 | 0.7 |
| 1.34 | 6.7 | 2.5 | 1.0 | 0.5 |
| .68 | 3.4 | 5.5 | 1.5 | 0.9 |
| .26 | 1.3 | 10.0 | 2.0 | 0.9 |

EXAMPLE 7

Two sets of experiments at 5° C. and 25° C. respectively were carried out using grouting solutions of pH 9.6 prepared according to the procedure of Example 6 except that the mimosa solids were reduced to 10% by weight. The data are summarized in Table II in which the symbols have the same meaning as in Table I.

TABLE II.—SILICATE AS GELLING AGENT, MIMOSA SOLIDS AT 10% LEVEL

| (a) | (b) | (c) | | (d) |
|---|---|---|---|---|
| | | Gel time (min.) | | Gel strength after 2 days at 25° C. (mm.) |
| $W_M$ | $W_M/W_T$, percent | 5° C. | 25° C. | |
| 2.68 | 26.8 | 13.0 | 6.5 | 12.0 |
| 1.34 | 13.4 | 26.0 | 12.0 | 13.5 |
| .68 | 6.8 | 29.0 | 11.5 | 14.8 |
| .34 | 3.4 | 36.0 | 11.5 | 13.0 |
| .17 | 1.7 | 40.5 | 13.0 | 18.0 |

EXAMPLE 8

Two sets of experiments at 5° C. and 25° C. respectively were carried out at pH 9.7 following the procedure of Example 6 using mimosa solids at the 20% level but replacing sodium silicate by sodium dichromate in quantity corresponding to the weight percent $W_M$ of chromium$^{VI}$. The results are summarized in Table III.

TABLE III.—DICHROMATE AS GELLING AGENT WITH MIMOSA SOLIDS AT 20% LEVEL

| (a) | (b) | (c) | | (d) |
|---|---|---|---|---|
| | | Gel time (min.) | | Gel strength after 2 days at 25° C. (mm.) |
| $W_M$ | $W_M/W_T$, percent | 5° C. | 25° C. | |
| 2.68 | 13.4 | 0.5 | 0.5 | 1.6 |
| 1.34 | 6.7 | 3.5 | 3.5 | 1.2 |
| .68 | 3.4 | 22.5 | 12.0 | 1.3 |
| .26 | 1.3 | (¹) | (¹) | |

¹ No gel.

EXAMPLE 9

Two sets of experiments at 5° C. and 25° C. respectively were carried out at pH 9.6 following the procedure of Example 7 using mimosa solids at the 10% level but replacing sodium silicate by amounts of sodium dichromate in quantity corresponding to the weight percent $W_M$ of chromium$^{VI}$ given in Column (a). The results are summarized in Table IV.

TABLE IV.—DICHROMATE AS GELLING AGENT WITH MIMOSA EXTRACT AT 10% LEVEL

| (a) | (b) | (c) | | (d) |
|---|---|---|---|---|
| | | Gel time (min.) | | Gel strength after 2 days at 25° C. (mm.) |
| $W_M$ | $W_M/W_T$, percent | 5° C. | 25° C. | |
| 2.68 | 26.8 | 2.0 | 2.0 | 19.6 |
| 1.34 | 13.4 | 4.0 | 4.0 | 11.1 |
| .68 | 6.8 | 44.0 | 7.5 | 11.6 |
| .34 | 3.4 | 185 | 55.0 | 11.3 |
| .17 | 1.7 | (¹) | (¹) | |

¹ No gel.

EXAMPLE 10

A series of grouting solutions was formulated with 10.0% mimosa extract solids, 1.00% sodium hydroxide, 0.40% dibutyl phthalate and sufficient sodium silicate to make the ratio of silicon element to mimosa solids equal to the $W_M/W_T$ values respectively given in Table V.

In each case, immediately after rapid mixing of the solution, a portion of the solution was injected into a two-inch mold containing 50–60 mesh foundry sand, the amount of the portions being such that the weight proportions were three parts sand to one part grouting solution. The treated sand was stored at about 21° C. and relative humidity about 45%. After the storage periods stated in the table, the grouted blocks were tested for their resistance to pressure in a hydraulic press. The pressure reached when the block crumbled was taken to be the compressive strength of the grouted structure. The results summarized in Table V show that the inclusion of the gelling agent of this invention effects a substantial increase in the compressive strength. In the absence of the gelling agent, the compressive strength is substantially zero.

Dimensional measurements on similarly grouted blocks indicate that there were no significant changes in dimensions after aging for 28 days.

For the purpose of comparison, there are also included in Table V the compressive strength obtained when 15% of paraformaldehyde based on mimosa solids is included in the grouting solution ($W_F$ is weight of paraformaldehyde) and the amount of silicate is reduced to the level preferably used in such formaldehyde-containing grouts. These results show that similar compressive strengths are obtained by the methods respectively using and not using formaldehyde.

TABLE V.—EFFECT OF SODIUM SILICATE ADDITIONS ON COMPRESSIVE STRENGTH OF SAND GROUTED WITH MIMOSA EXTRACT

| $W_M/W_T$, percent | $W_F/W_T$, percent | Compressive strength (p.s.i.) at— | | |
| --- | --- | --- | --- | --- |
| | | 24 hrs. | 72 hrs. | 170 hrs. |
| 13.4 | | 30 | 45 | 46 |
| 6.7 | | 30 | 30 | 45 |
| 3.4 | | 30 | 30 | 50 |
| 1.7 | | 40 | 45 | 50 |
| 0.6 | 15.0 | 40 | 45 | 45 |

EXAMPLE 11

This example illustrates how variations in the polyphenolic solids level and in the proportion of the gelling agent of this invention can be used to control the degree of resistance to pressure. Grouting solutions were prepared with mimosa solids and sodium silicate in amounts given in Table VI. The experiments were carried out at 25° C. Immediately after mixing the ingredients, each mixture was allowed to set to a height of 4 inches in a metal tube 8 inches in height and 1.5 inches in diameter, being open at the top and having in its base several slits of dimensions approximately 1 x ⅛″. The tubes containing gel were filled to the top with water and allowed to stand for a period of 24 hours. The tubes were then removed from the water and air pressure applied at the top of the tube. The pressure was increased gradually until the gel broke down and was extruded through the slits. The results summarized in Table VI clearly indicate that the presence of the gelling agents of this invention in the amounts used substantially increased the present required to extrude the gel.

TABLE VI.—RESISTANCE OF MIMOSA-SILICATE GROUTING GELS TO PRESSURE AT 25° C.

| Mimosa solids in grouting solution, percent | $W_M/W_T$, percent | Pressure (p.s.i.) required to extrude gel after 24 hrs. under water. |
| --- | --- | --- |
| 20 | 6.7 | >55 |
| 20 | 1.7 | >55 |
| 15 | 1.7 | 7 |
| 10 | 13.4 | 4 |

It will be understood that it is intended to cover all changes and modifications of the examples of the invention herein chose for the purpose of illustration which do not constitute departures from the spirit and scope of the invention.

What we claim is:

1. A method for stabilizing soil which comprises
   (A) contacting the soil with an aqueous alkaline gel-forming composition in the absence of formaldehyde, said composition being adjusted to pH between 8.5 and 11.5 and consisting essentially of
      (a) between about 2% and 45% of an unsulfonated polyphenolic vegetable material of the group consisting of tannin extracts, catechins and alkaline extracts of coniferous tree barks, said polyphenolic material being soluble in alkaline solution, able to gel rapidly and having a formaldehyde combining capacity of at least 5.0, and
      (b) a gelling agent dispersible in said composition and containing a complexing element selected from silicon, vanadium and molybdenum and being in amount sufficient to gel the composition; and
   (B) allowing the treated soil to form a substantially compact mass.

2. The method of claim 1 wherein the complexing element is present in an amount corresponding to between about 0.1% and 30% based on the weight of dry polyphenolic material.

3. The method of claim 1 wherein the gelling agent is a silicate selected from the group consisting of sodium metasilicates, "egg preserver solution" containing $$Na_2Si_3O_7$$

potassium silicates varying in composition from $K_2Si_2O_5$ to $K_2Si_3O_7$ and ammonium silicate.

4. The method of claim 20 wherein the gelling agent is sodium dichromate.

5. The method of claim 1 wherein the polyphenolic material is selected from the vegetable tannin extracts of mimosa, quebracho, mangrove and wattle.

6. The method of claim 1 wherein the polyphenolic material is selected from the catechin extracts of acacia catechin, acacia suma and mahogany wood.

7. The method of claim 1 wherein the polyphenolic material is selected from the alkaline extracts of the barks of Western hemlock, Douglas fir, Sitka spruce and Southern yellow pine.

8. The method of claim 1 wherein the polyphenolic material is the extract of mimosa.

9. The method of claim 1 wherein the gel-forming composition contains also between about 1% and about 100% of sodium chloride based on the weight of dry polyphenolic material.

10. A formaldehyde-free aqueous gel-forming composition, useful in stabilizing soil, having a pH of about 8.5–11.5, said composition consisting essentially of
    (a) between about 2% and 45% of an unsulfonated polyphenolic vegetable material of the group consisting of tannin extracts, catechins and alkaline extracts of coniferous tree barks, said polyphenolic material being soluble in alkaline solution, able to gel rapidly and having a formaldehyde combining capacity of at least 5.0, and
    (b) a gelling compound derived from a complexing element, selected from silicon, vanadium and molybdenum, being present in an amount corresponding to between about 0.1 and 30 parts of said element per 100 parts of polyphenolic material.

11. The composition of claim 10 wherein the polyphenolic material is tannin extract of mimosa and the gelling compound is a silicate selected from the group consisting of sodium metasilicates, "egg preserver solution" containing $Na_2Si_3O_7$, potassium silicates varying in composition from $K_2Si_2O_5$ to $K_2Si_3O_7$ and ammonium silicate.

12. A formaldehyde-free aqueous gel-forming composition, useful in stabilizing soil, having a pH of about 8.5–11.5, said composition consisting essentially of
    (a) between about 2% and 45% of an unsulfonated polyphenolic vegetable material of the group consisting of tannin extracts, catechins and alkaline extracts of coniferous tree barks, said polyphenolic material being soluble in alkaline solution, able to gel rapidly and having a formaldehyde combining capacity of at least 5.0, and
    (b) a gelling compound derived from the complexing element, chromium[VI], said chromium[VI] being present in an amount corresponding to between about 3.4 and 30 parts of said element per 100 parts of polyphenolic material.

13. The composition of claim 11 containing also between about 1 and about 100 parts of sodium chloride per 100 parts of polyphenolic material.

14. The soil-grouting process which comprises injecting into soil to be stabilized and/or strengthened, an aqueous alkaline (pH 8.5-11.5) gel-forming composition substantially free of formaldehyde and consisting essentially of a mixture of polyphenolic material of the group consisting of the unsulfonated vegetable tannin extracts of mimosa, quebracho, mangrove and wattle, catechin tannins and the alkaline extract of coniferous barks, dispersed in sufficient water to form a 2% to 45% solution by weight, said polyphenolic material being substantially soluble in alkaline aqueous solution, being capable of rapid gelation and having a formaldehyde combining capacity of at least 5.0; and a gelling compound which provides in the composition a complexing element of the group consisting of silicon, vanadium and molybdenum, the amount of said complexing element in said composition being within the range of from about 0.1% to 30% based on the dry weight of the solid polyphenolic material, said composition being thoroughly mixed before injecting it into the soil, said complexing element being proportioned to effect the gelling rate.

15. The process for preparing a gel in association with solid particles which comprises: intermixing an unsulfonated vegetable tannin, extracted from mimosa, with sufficient water which is substantially free of formaldehyde and whose pH is in the range of 8.5-11.5, to form a 7-23% solution by weight; intermixing with said formaldehyde-free solution from 1.0% to 15.0% of silicon as a complexing element being present as silicate and effecting a gelling action of the composition, said element being selected in such an amount as to control the gelling rate at the temperature of the soil; and promptly before any appreciable reaction takes place, injecting the intermixed components into a solid particulate material to form a stable gel structure.

16. A powdered product, useful as a component of a grouting dispersion, consisting essentially of 100 parts by weight mimosa extract solids, and between about 1 and about 100 parts of sodium chloride.

17. In a method for stabilizing soil which comprises
(A) contacting the soil with an aqueous gel-forming composition having pH between 8.5 and 11.5 and containing
 (a) a polyphenolic vegetable material of the group consisting of tannin extracts, catechins, and alkaline extracts of coniferous tree barks, said polyphenolic material being soluble in alkaline solution, able to gel rapidly and having a formaldehyde combining capacity of at least 5.0, and
 (b) a gelling agent dispersible in said composition and
(B) allowing the treated soil to form a substantially compact mass;
the improvement whereby said composition consists essentially of said polyphenolic material in the amount of 2-45% by weight and said gelling agent in the absence of formaldehyde, and wherein said gelling agent contains a complexing element selected from silicon, vanadium and molybdenum in an amount sufficient to gel the composition in the absence of formaldehyde.

18. The method of claim 1 wherein the complexing element is selected from vanadium and molybdenum.

19. A method for stabilizing soil which comprises
(A) contacting the soil with an aqueous alkaline gel-forming composition in the absence of formaldehyde, said composition being adjusted to pH between 8.5 and 11.5 and consisting essentially of
 (a) between about 2% and 45% of an unsulfonated polyphenolic vegetable material of the group consisting of tannin extracts, catechins and alkaline extracts of coniferous tree barks, said polyphenolic material being soluble in alkaline solution, able to gel rapidly and having a formaldehyde combining capacity of at least 5.0, and
 (b) a gelling agent selected from the potassium, sodium, lithium and ammonium salts of silicate, vanadate and molybdate, and the chlorides, sulfates, nitrates, hydroxides and oxides of silicon, vanadium and molybdenum, the amount of said gelling agent corresponding to about 1% to 15% of the respective silicon, vanadium or molybdenum contained therein based on polyphenolic solids.

20. A method for stabilizing soil which comprises
(A) contacting the soil with an aqueous alkaline gel-forming composition in the absence of formaldehyde, said composition being adjusted to pH between 8.5 and 11.5 and consisting essentially of
 (a) between about 2% and 45% of an unsulfonated polyphenolic vegetable material of the group consisting of tannin extracts, catechins and alkaline extracts of coniferous tree barks, said polyphenolic material being soluble in alkaline solution, able to gel rapidly and having a formaldehyde combining capacity of at least 5.0, and
 (b) a gelling agent dispersible in said composition and containing the complexing element, chromium$^{VI}$ said chromium$^{VI}$ being in amount from at least about 3.4% to about 30% based on the weight of dry polyphenolic material; and
(B) allowing the treated soil to form a substantially compact mass.

21. The composition of claim 12 wherein the polyphenolic material (a) is tannin extract of mimosa and the gelling compound (b) is sodium dichromate.

References Cited

UNITED STATES PATENTS 3,391,542   7/1968   Herrick et al. _____ 61—36 R
3,490,933   1/1970   Van Blaricom ____ 106—287 SS
2,702,791   2/1955   Teichmann _____ 252—8.5

FOREIGN PATENTS 1,122,308   8/1968   England.
1,016,698   1/1966   England.

THEODORE MORRIS, Primary Examiner

U.S. Cl. X.R.
106—287 SS

PO-1050
(5/69)

UNITED STATES PATENT OFFICE
CERTIFICATE OF CORRECTION

Patent No. 3,706,581  Dated 12/19/72

Inventor(s) Anthony James Whitworth et al

It is certified that error appears in the above-identified patent and that said Letters Patent are hereby corrected as shown below:

Sir:

Column 5, line 32, after "solids are",

Insert - - particularly preferred - -

Delete "suitable. Amounts corresponding to 1%"

Column 5, line 43, after "terial",

Delete ", and only very small additional amounts of alkali"

Insert - - used. If the polyphenolic material is an alkaline ex- --

Column 9, line 44

Replace "present" by- - pressure -- .

Signed and sealed this 29th day of May 1973.

(SEAL)
Attest:

EDWARD M.FLETCHER,JR.         ROBERT GOTTSCHALK
Attesting Officer             Commissioner of Patents